US012731375B2

(12) United States Patent
Park et al.

(10) Patent No.: US 12,731,375 B2
(45) Date of Patent: Sep. 8, 2026

(54) IMAGE PROCESSING METHOD AND ELECTRONIC DEVICE SUPPORTING SAME

(71) Applicant: Samsung Electronics Co., Ltd., Suwon-si (KR)

(72) Inventors: Mijin Park, Suwon-si (KR); Moohyun Kim, Suwon-si (KR); Jihyun Yeon, Suwon-si (KR); Jongwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 18/319,089

(22) Filed: May 17, 2023

(65) Prior Publication Data

US 2023/0290121 A1 Sep. 14, 2023

Related U.S. Application Data

(63) Continuation of application No. PCT/KR2021/018953, filed on Dec. 14, 2021.

(30) Foreign Application Priority Data

Dec. 18, 2020 (KR) ........................ 10-2020-0178266

(51) Int. Cl.

*G06V 10/764* (2022.01)
*G06T 3/40* (2024.01)

(Continued)

(52) U.S. Cl.

CPC .............. *G06V 10/764* (2022.01); *G06T 3/40* (2013.01); *G06V 10/443* (2022.01); *G06V 20/44* (2022.01); *G06V 20/52* (2022.01)

(58) Field of Classification Search

CPC .... G06V 10/764; G06V 10/443; G06V 10/74; G06V 20/44; G06V 20/52; G06V 20/46;

(Continued)

(56) References Cited

U.S. PATENT DOCUMENTS 9,009,805 B1 4/2015 Kirby et al.
9,602,860 B2 3/2017 Laska et al.

(Continued)

FOREIGN PATENT DOCUMENTS

KR 10-1178886 B1 9/2012
KR 10-1709715 B1 2/2017

(Continued)

OTHER PUBLICATIONS

International Search Report with Written Opinion and English translation dated Mar. 30, 2022; International Appln. No. PCT/KR2021/018953.

(Continued)

*Primary Examiner* — John B Strege
(74) *Attorney, Agent, or Firm* — Jefferson IP Law, LLP

(57) ABSTRACT

An electronic device is provided. The electronic device includes a communication circuit configured to transmit and receive data to and from an external device, a memory, and a processor, wherein the processor may store a user pattern in the memory based on first sensing information detected during a first time period by at least one of an external camera device or an external Internet of things (IoT) device, detect occurrence of an irregular event based on second sensing information detected during a second time period by the external camera device or the external IoT device and the stored user pattern, match the irregular event that occurs with a plurality of images photographed by the external camera device, and determine priorities of the plurality of images based on a matching result.

17 Claims, 12 Drawing Sheets

(51) Int. Cl.
*G06V 10/44* (2022.01)
*G06V 20/40* (2022.01)
*G06V 20/52* (2022.01)

(58) Field of Classification Search
CPC ......... G06T 3/40; G06F 16/71; G06F 16/743; G06F 16/7867; G16Y 20/10; G16Y 40/50; H04N 21/442; H04N 21/45; H04N 21/458; H04N 21/845; H04N 21/8549; H04N 21/44204; H04N 21/4532; H04N 21/8456
See application file for complete search history.

(56) References Cited

U.S. PATENT DOCUMENTS 10,529,101 B1 * 1/2020 Kerzner ................. G06V 20/52
10,936,655 B2 3/2021 Siminoff et al.
10,943,123 B2 3/2021 Siminoff et al.
11,011,035 B2 5/2021 Laska et al.
11,281,913 B2 3/2022 Wengrovitz et al.
11,823,539 B2 * 11/2023 Hodge ............. G08B 13/19671
2006/0015888 A1 * 1/2006 Shih ................. G08B 13/19673 348/E5.062
2016/0316176 A1 10/2016 Laska et al.
2018/0132011 A1 5/2018 Shichman et al.
2018/0197012 A1 7/2018 Wengrovitz et al.
2018/0285633 A1 * 10/2018 Alcock .................. G06V 40/20
2018/0357247 A1 * 12/2018 Siminoff .......... G08B 13/19606
2018/0357870 A1 12/2018 Siminoff et al.
2020/0145620 A1 * 5/2020 Alcantara ............. G06V 20/35

FOREIGN PATENT DOCUMENTS

KR 10-2019-0028016 A 3/2019
KR 10-2019-0032080 A 3/2019
KR 10-2019-0053651 A 5/2019
KR 10-2013952 B1 10/2019
KR 10-2020-0073374 A 6/2020
KR 10-2139524 B1 7/2020
KR 10-2154434 B1 9/2020
WO WO-2014092547 A1 * 6/2014 ....... G08B 13/19693

OTHER PUBLICATIONS

Korean Office Action with English translation dated Jan. 2, 2025; Korean Appln. No. 10-2020-0178266.

* cited by examiner

IMAGE PROCESSING METHOD AND ELECTRONIC DEVICE SUPPORTING SAME

CROSS-REFERENCE TO RELATED APPLICATION(S)

This application is a continuation application, claiming priority under § 365(c), of an International application No. PCT/KR2021/018953, filed on Dec. 14, 2021, which is based on and claims the benefit of a Korean patent application number 10-2020-0178266, filed on Dec. 18, 2020, in the Korean Intellectual Property Office, the disclosure of which is incorporated by reference herein in its entirety.

BACKGROUND

1. Field

The disclosure relates to an image processing method and an electronic device supporting the same.

2. Description of Related Art

Various types of Internet-of-things (IoT) devices have been used. For example, a server and/or a user terminal may gather images and/or information collected through IoT devices such as camera devices, lighting devices, or door recognition devices, and may provide the gathered information to a user in various schemes.

An IoT camera may automatically take an image or according to a specified condition. The specified condition may be a condition for generating an event such as motion recognition, sound recognition, or person recognition.

The image captured by an IoT camera may be transmitted to a server and/or user terminal. The user terminal may execute an IoT-related application (hereinafter referred to as IoT app) and display a list of videos (hereinafter referred to as video clips) taken during a specified time through thumbnails. When one image from the list is selected by a user's input, the selected image may be reproduced.

The above information is presented as background information only to assist with an understanding of the disclosure. No determination has been made, and no assertion is made, as to whether any of the above might be applicable as prior art with regard to the disclosure.

SUMMARY

An electronic device may execute an IoT app and display a list of images photographed by an IoT camera through thumbnails. For example, a list of video clips may be arranged in chronological order along with thumbnails, and the thumbnail of a video clip may be set as an image at the start of the video.

In this case, a video clip of interest to a user among a list of numerous video clips may not be distinguished from other video clips, and the user may have to play each video clip to check the content, causing inconvenience.

Aspects of the disclosure are to address at least the above-mentioned problems and/or disadvantages and to provide at least the advantages described below. Accordingly, an aspect of the disclosure is to provide an electronic device that preferentially displays information related to a video clip that is likely to be of interest to a user by using a user pattern related to an IoT device.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit configured to transmit and receive data to and from an external device, a memory, and a processor, wherein the processor may store a user pattern in the memory based on first sensing information detected during a first time period at least one of by an external camera device or an external Internet of things (IoT) device, detect occurrence of an irregular event based on second sensing information detected during a second time period by the external camera device or the external IoT device and the stored user pattern, match the irregular event that occurs with a plurality of images photographed by the external camera device, and determine priorities of the plurality of images based on a matching result.

In accordance with another aspect of the disclosure, a method of processing an image performed by an electronic device is provided. The method includes storing a user pattern in a memory of the electronic device based on first sensing information detected during a first time period by at least one of an external camera device or an external Internet of things (IoT) device, detecting occurrence of an irregular event based on second sensing information detected during a second time period by the external camera device or the external IoT device and the stored user pattern, matching the irregular event that occurs with a plurality of images photographed by the external camera device, and determining priorities of the plurality of images based on a matching result.

According to various embodiments of the disclosure, an electronic device may preferentially display information related to a video clip that is likely to be of interest to a user by using a user pattern related to an IoT device.

According to various embodiments of the disclosure, an electronic device may provide a guide for a general pattern and an event of a user.

According to various embodiments of the disclosure, an electronic device may update a thumbnail of a video clip by reflecting a user's general pattern and an event.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
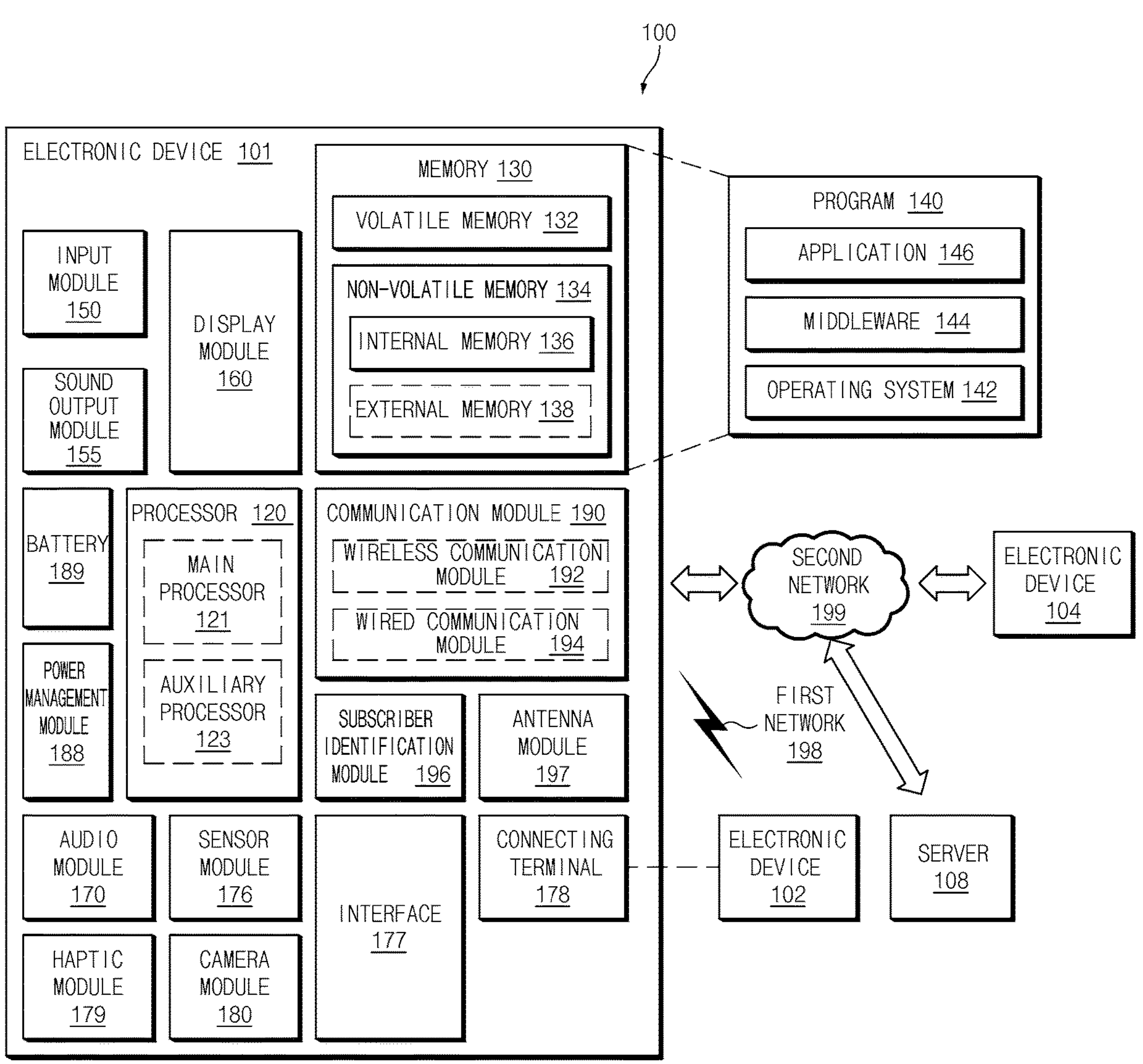
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
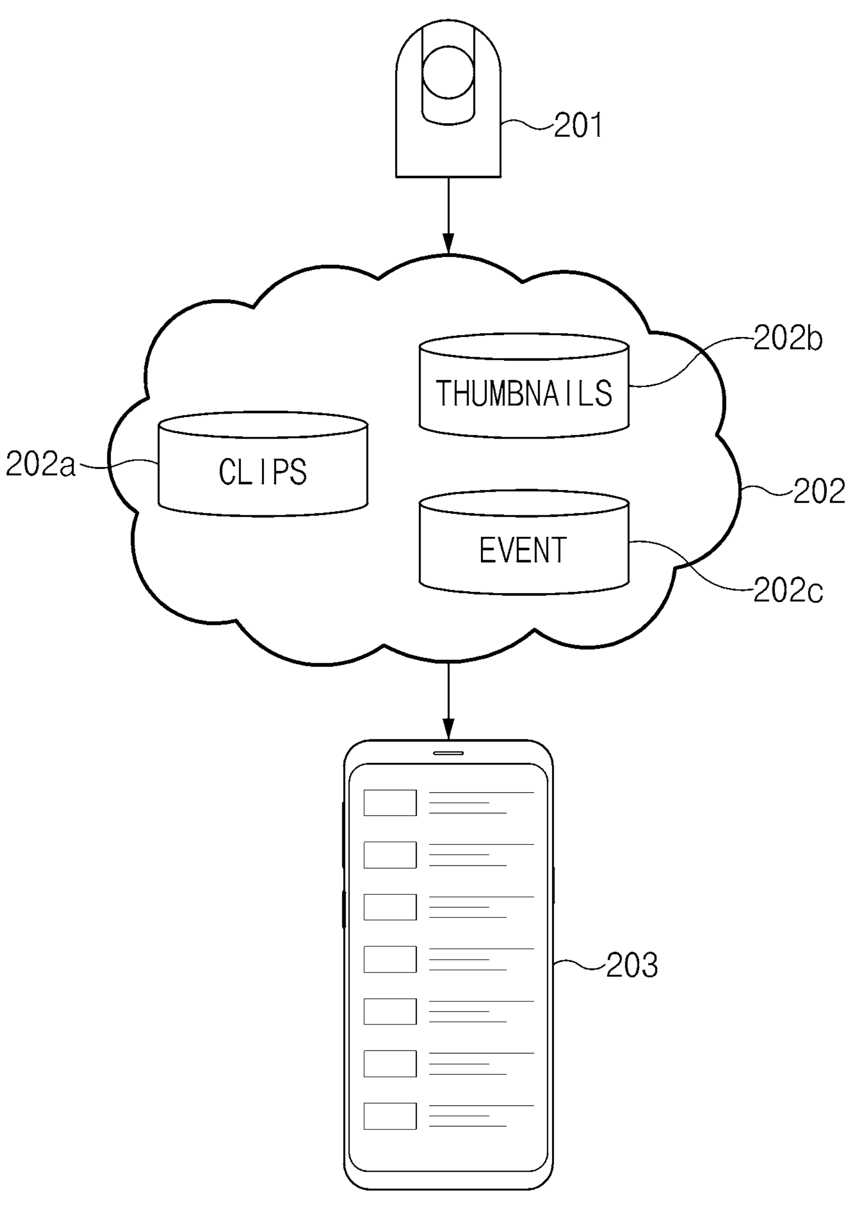
FIG. 2 is a diagram illustrating a configuration of an image capture system according to an embodiment of the disclosure.

FIG. 2 is a diagram illustrating a configuration of an image capture system according to an embodiment of the disclosure.

Referring to FIG. 2, an image capture system 200 may include a camera device 201, a server 202, and a user terminal 203.

According to an embodiment, the camera device 201 (e.g., the electronic device 102 or the electronic device 104 of FIG. 1) may capture a video clip. For example, the camera device 201 may be an IoT camera installed in a house or office.

According to various embodiments, the camera device 201 may capture images (or video clips) under various conditions according to automatic settings or user settings. For example, the camera device 201 may obtain a video clip when recognizing an object (e.g., sound recognition, motion recognition, or face recognition) by a sensor mounted on the camera device 201 or image processing during a time (e.g., from 7:00 am to 7:00 pm) specified by a user setting.

According to an embodiment, the camera device 201 may transmit a captured image to the server 202. The camera device 201 may transmit image data in a real-time streaming scheme, and transmit a video clip when the capture of the video clip is completed, or at a specified time period.

According to an embodiment, the server 202 (e.g., the server 108 of FIG. 1) may receive a video clip captured by the camera device 201 and store the video clip in a first database **202*a*. The server 202 may store and manage a thumbnail for each video clip stored in the first database 202*a* in a second database 202*b*. A thumbnail may be stored as a starting image of a video clip or stored based on sensing information recognized by the camera device 201 or another IoT device (not shown). The thumbnail may be generated and received from the camera device 201**.

According to various embodiments, the server 202 may receive sensing information recognized by the camera device 201 or another IoT device (not shown). For example, the server 202 may receive sensing information (or event) obtained by recognizing an object (e.g., sound recognition, motion recognition, or face recognition) by a sensor mounted on the camera device 201 or by image processing, and may store the sensing information in a third database 202*c*. As another example, the server 202 may be installed in the same place as and/or close to the place where the camera device 201 is installed, such as a lighting device, a pet feeder, a front door sensor, or a wall pad. Sensing information (or events) obtained from the device may be received and stored in the third database 202*c*.

According to various embodiments, the user terminal 203 (e.g., the electronic device 101 of FIG. 1) may receive sensing information (hereinafter, first sensing information) during the first time period from the server 202. Based on the received first sensing information, the user terminal 203 may extract a change pattern (hereinafter, referred to as a user pattern) of the sensing information during the first time period, and store it in a database. The user terminal 203 may store changes in data according to the type of an IoT device that collects the first sensing information, the generation time, and/or the day of the week. For example, the user terminal 203 may store a user pattern based on the first sensing information during the last 1 month or 3 months. The user pattern may be extracted from the server 202 and provided to the user terminal 203.

According to various embodiments, the user terminal 203 may determine a period (hereinafter, referred to as an irregular event) that does not match a user pattern based on sensing information (hereinafter, referred to as second sensing information) during a second time period (e.g., the last 24 hours). The irregular event may be a period in which information collected by the same IoT device that obtains the first sensing information differs by more than a specified value.

According to an embodiment, the irregular event may include a period in which a specific activity occurs. For example, in a state where a user pattern in which an IoT lighting device at a front door is not turned on between 08:00 and 17:00 on weekdays is stored, when data that the IoT lighting device is turned on between 09:05 and 09:10 is included in the second sensing information, the user terminal 203 may determine the period between 09:05 and 09:10 as an occurrence period of an irregular event.

According to another embodiment, the irregular event may include a non-occurrence (non-occurrence) period of a specific activity. For example, in a state where a user pattern in which the IoT lighting device at the front door is turned on between 07:00 and 07:05 on weekdays is stored, when the second sensing information includes data that the IoT lighting device is not turned on between 07:00 and 07:05, the user terminal 203 may determine the period between 07:00 and 07:05 as an occurrence period of the irregular event.

According to an embodiment, the user terminal 203 may receive an image (or video clip) from the server 202. The video clip may be an image captured by the camera device 201. The user terminal 203 may execute an IoT app and display a list of video clips during a specified time period (e.g., the last 24 hours). The list may include thumbnail images and/or time lapses set to video clips, respectively. The user terminal 203 may reproduce a video clip selected by a selection input of a user.

According to various embodiments, the user terminal 203 may set the priority of a video clip associated with an irregular event to be higher than those of other video clips. The user terminal 203 may change the size of a thumbnail of the video clip according to the priority, display it with priority, or allow the user to easily recognize it.

Figure 3:
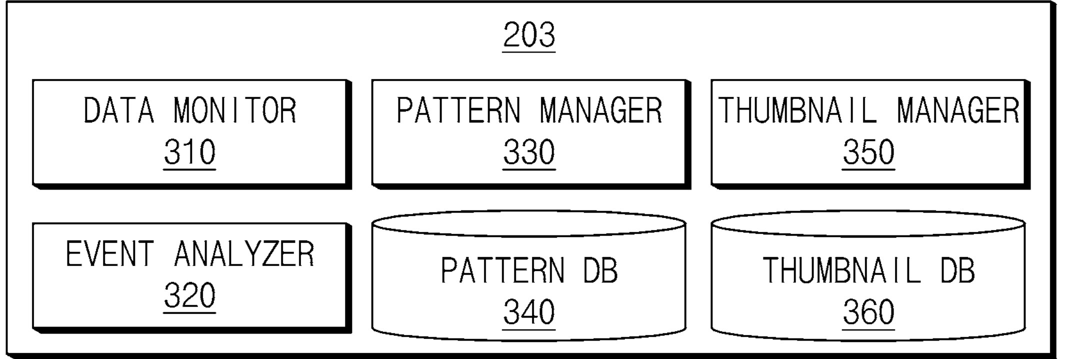
FIG. 3 is a diagram illustrating a user terminal according to an embodiment of the disclosure.

FIG. 3 is a diagram illustrating the user terminal 203 according to an embodiment of the disclosure. In the user terminal 203 of FIG. 3, components related to image display are classified according to functions, but the embodiment is not limited thereto.

Referring to FIG. 3, the user terminal 203 may include a data monitor 310, an event analyzer 320, a pattern manager 330, a pattern database 340, a thumbnail manager 350, and a thumbnail database 360.

According to an embodiment, the data monitor 310 may receive and manage data such as sensing information, video clips, and/or thumbnails of video clips from a server (e.g., the server 202 of FIG. 2). The data monitor 310 may receive and store related data when new data is added to the server 202 or when an IoT app is executed.

According to an embodiment, the event analyzer 320 may extract an occurrence period and/or an occurrence time point according to characteristics of sensing information detected by the camera device 201 or another IoT device. The event analyzer 320 may store the extracted information in the pattern database 340.

For example, the event analyzer 320 may extract a time period in which the video clip is captured by using a recording start point of the video clip captured by the camera device 201 and a length of the video clip. The event analyzer 320 may determine a correlation between a time period in which a video clip is captured and sensing information, and generate/compare a pattern.

According to an embodiment, the pattern manager 330 may find a regularity using the event analysis result, and when a new event is discovered, analyze and manage how much it matches the existing regularity. For example, the pattern manager 330 may generate a timeline based on 24 hours based on the information analyzed by the event analyzer 320. The pattern manager 330 may generate a first timeline (e.g., a general timeline) of a user by analyzing the accumulated timelines. The pattern manager 330 may set the first timeline as a general pattern of a user and store it in the pattern database 340.

According to an embodiment, when detecting that a new event or video clip is generated, the pattern manager 330 may compare the time stamp of the corresponding event with the user's first timeline. The pattern manager 330 may determine a period in which inconsistency occurs as an occurrence period of an irregular event according to a comparison result. The pattern manager 330 may determine the importance of the irregular event by using the repeatability of the irregular event and the size of the error.

According to an embodiment, the pattern database 340 may store information extracted from the event analyzer 320 or the pattern manager 330.

According to an embodiment, when the thumbnail manager 350 compares the occurrence time of the irregular event and the video clip data, and the irregular event is included between the start time point of the video clip and the end time point of the video clip (or the sum of the start time point of the video clip and the duration of the video clip), the thumbnail manager 350 may decode the data of video clip to generate a thumbnail of a time point at which the irregular event occurs. The thumbnail manager 350 may generate a summary image or time-lapse image of a video clip by reflecting the irregular event.

According to an embodiment, the thumbnail database 360 may store a thumbnail image generated by the camera device 201 when a video clip is generated. When the thumbnail image is updated by the thumbnail manager 350, the thumbnail database 360 may update and store the thumbnail image of the corresponding video clip.

According to various embodiments, the operations of the data monitor 310, the event analyzer 320, the pattern manager 330, and the thumbnail manager 350 may be part of the operation of the processor 120 in FIG. 1.

According to various embodiments, at least several of the operations of the data monitor 310, the event analyzer 320, the pattern manager 330, and the thumbnail manager 350 may be performed by the server 202 or another server, and may be transmitted to the user terminal 203.

According to various embodiments, the pattern database 340 or the thumbnail database 360 may be part of the memory 130 in FIG. 1.

Figure 4:
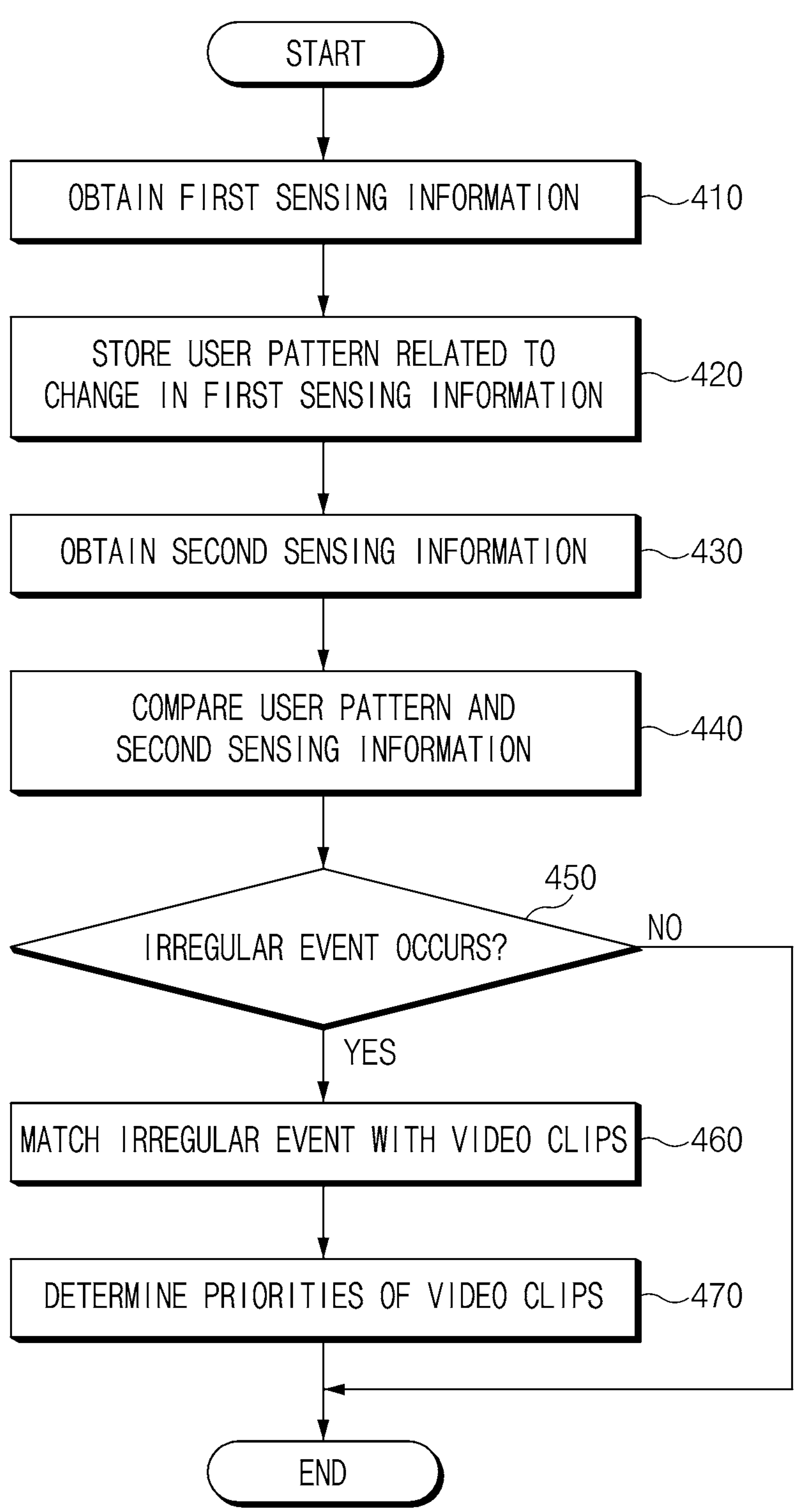
FIG. 4 is a flowchart illustrating a method of processing an image according to an embodiment of the disclosure.

FIG. 4 is a flowchart illustrating a method of processing an image according to an embodiment of the disclosure.

Referring to FIG. 4, in operation 410, the processor 120 may obtain the first sensing information recognized by the camera device 201 and/or another IoT device (not shown) during the first time period. According to an embodiment, the processor 120 may receive the first sensing information through the server 202.

According to an embodiment, the first sensing information may include data obtained by recognizing an object (e.g., sound recognition, motion recognition, or face recognition) by a sensor mounted on the camera device 201 or by image processing of the camera device 201. For example, the camera device 201 may perform one or more image processes on an acquired image and/or an image stored in a memory (e.g., the memory of the camera device 201). The one or more image processes may include, for example, depth map generation, 3D modeling, panorama generation, feature point extraction, image synthesis, or image compensation (e.g., noise reduction, resolution adjustment, brightness adjustment, blurring, sharpening, or softening). Additionally or alternatively, the camera device 201 may perform control (e.g., exposure time control or lead-out timing control) for at least one (e.g., an image sensor) of the components for obtaining image.

According to another embodiment, the first sensing information may include data obtained by various IoT devices, such as a lighting device, a pet feeder, a front door sensor, a wall pad, and the like, installed at the same place and/or close to the place where the camera device 201 is installed.

According to various embodiments, the first time period may be set to a period such as a recent week, a recent three weeks, or a recent month.

In operation 420, the processor 120 may store a user pattern related to a change in the first sensing information in the memory 130. The processor 120 may accumulate and store the data of the first sensing information, which is repeated at least (or more than) a specified number of times and within a specified error range, in the database as a user pattern, and may remove the data that occurs less than the specified number of times or exceeds the specified error range without separate storage. For example, the user pattern may include information in which the first sensing information is changed every 24 hours for each day of the week.

According to various embodiments, the user pattern may be processed and stored through a separate server, and the processor 120 may receive and store the user pattern from the server.

In operation 430, the processor 120 may obtain the second sensing information recognized by the camera device 201 or another IoT device (not shown) during the second time period. The second time period may be a shorter time period (e.g., the last 24 hours) than the first time period (e.g., one month) of operation 410. The second sensing information may be the same type of data as the first sensing information.

For example, the second sensing information may include the data obtained by recognizing an object (e.g., sound recognition, motion recognition, or face recognition) by a sensor mounted on the camera device 201 or by image processing of the camera device 201 during the last 24 hours. In addition, the second sensing information may include data obtained by various IoT devices, such as a lighting device, a pet feeder, a front door sensor, a wall pad, and the like, installed at the same place and/or close to the place where the camera device 201 is installed, during the last 24 hours.

In operation 440, the processor 120 may compare the user pattern and the second sensing information. The processor 120 may compare data of the same property in the same time zone, which is obtained from the same type of IoT device.

In operation 450, the processor 120 may check the occurrence of an irregular event based on the comparison result. The irregular event may be a period in which the second sensing information differs from the user pattern by a specified value or more. The irregular event may include a period in which a specific activity occurs or a period in which a specific activity does not occur.

In operation 450, the processor 120 may perform operation 460 when an irregular event occurs based on the comparison result, and may end the image processing operation when any irregular events do not occur.

In operation 460, the processor 120 may match the irregular event with a plurality of video clips photographed by the camera device 201. The processor 120 may receive and store a plurality of video clips photographed by the camera device 201 from the server 202. The processor 120 may determine a video clip (hereinafter, a matching video clip) overlapping at least a part of the occurrence time period of the irregular event among the plurality of video clips. Additional information about the determination of matching video clips may be provided through FIG. 6.

In operation 470, the processor 120 may determine the priority of the plurality of video clips based on the matching result. The processor 120 may set the priority of the matching video clip higher than that of other video clips.

According to an embodiment, the processor 120 may display a list of a plurality of video clips through an IoT app according to priority. The processor 120 may display a matching video clip having a high priority at the top of the list or as a larger thumbnail image (see FIG. 7).

According to various embodiments, the processor 120 may set a thumbnail image of a matching video clip according to an irregular event. For example, the processor 120 may set or update a thumbnail image of a matching video clip with an image of a starting point, a middle point, and/or a point having the most motion of an irregular event. Additional information about updating the thumbnail image may be provided through FIGS. 9 and 10.

According to various embodiments, the processor 120 may generate and display a summary image and/or a time-lapse image related to an irregular event on a display.

According to various embodiments, the processor 120 may display a graphed timeline on a display when an irregular event occurs.

Figure 5:
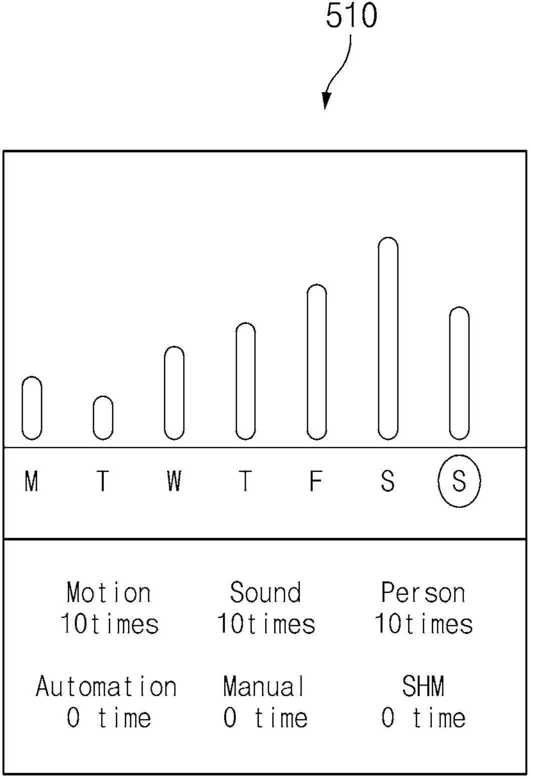
FIG. 5 is a diagram illustrating a user pattern according to an embodiment of the disclosure.
Figure 5:
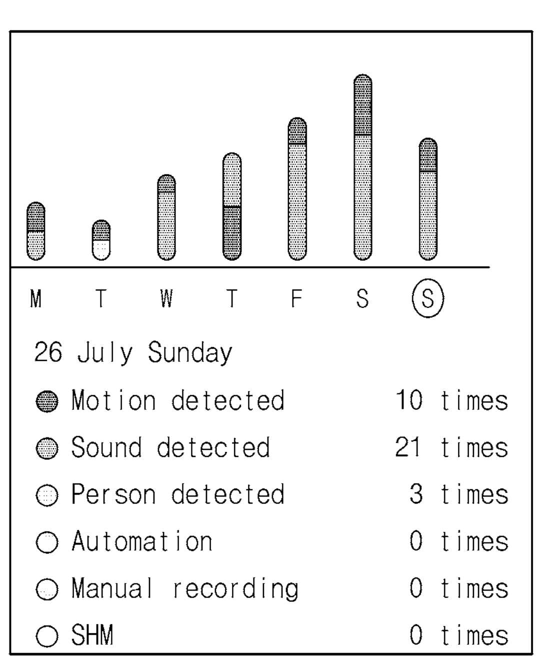
Figure 5:
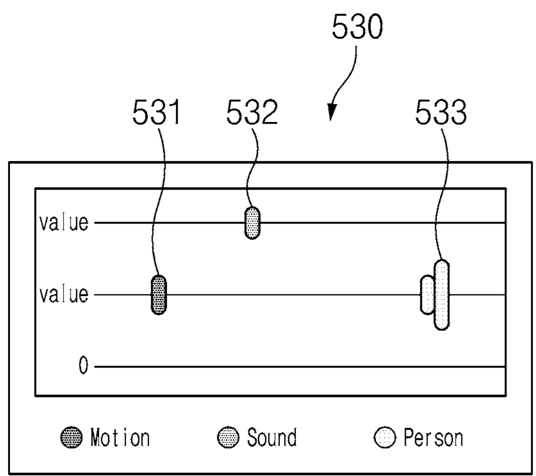

FIG. 5 is a diagram illustrating a display of a user pattern (e.g., a user interface (UI)) according to an embodiment of the disclosure. FIG. 5 is illustrative, but the embodiment is not limited thereto.

Referring to FIG. 5, the processor 120 may store a user pattern based on the first sensing information. Information on a user pattern may be displayed through the user interface (e.g., a graph) of the IoT app.

In a first graph 510, the processor 120 may classify and display the number of occurrences of each item constituting the first sensing information for each day of the week. For example, the processor 120 may display the sum of the number of motion recognition, the number of sound recognition, and/or the number of face recognition for each day of the week.

In a second graph 520, the processor 120 may classify and display the number of occurrences of each item constituting the first sensing information. For example, the processor 120 may display the number of motion recognition, the number of sound recognition, and/or the number of face recognition in different colors for each day of the week to be distinguishable.

In a third graph 530, the processor 120 may display a specific value of the first sensing information for each day through a separate user interface. For example, the processor 120 may display the change range of a motion recognition value 531, a sound recognition value 532, and/or a face recognition value 533 together with a reference value.

According to an embodiment, the processor 120 may generate a time line in which sensing information is recorded using a generation period of the sensing information. The processor 120 may extract a user pattern by cutting the timeline on a base of 24 hours, collecting and analyzing several 24-hour based timelines.

According to various embodiments, the processor 120 may accumulate and convert the first sensing information into a database whenever a user executes an IoT app to store a highly reliable user pattern.

According to various embodiments, the processor 120 may compare the stored user pattern with the second sensing information for the most recent 24 hours, accumulate matched information as a user pattern, and determine mismatched information as an irregular event.

For example, when human motion is detected at the front door from 7:00 am to 7:40 am on weekdays, and from 7:40 to 7:45, some days a person is detected or not detected, the processor 120 may store a user pattern in which a user goes to work between 7:40 and 7:45 every day and the error range of the attendance time is 5 minutes.

As another example, a user pattern in which a dog's movement in the kitchen is detected more than a specified value from 1:00 pm to 3:00 pm every day is stored, and the dog's motion is not detected in the kitchen between 1:00 pm and 3:00 pm today, the processor 120 may determine that an irregular event has occurred between 1:00 pm and 3:00 pm.

According to an embodiment, when an irregular event is detected, the processor 120 may display the occurrence time point and/or duration in a graph form on the display.

According to various embodiments, the processor 120 may determine an irregular event by using sensing information recognized by various IoT devices.

For example, when a user pattern in which movement and sound occur intermittently and usually at home between 2:00 pm and 4:00 pm is stored, movement and sound at home for about 40 minutes between 2:00 pm and 2:40 pm may not occur. In this case, the processor 120 may determine that an irregular event has occurred when front door access information and/or a state change of a lighting device do not occur, and when the front door access information and/or the state change of the lighting device occurs, the processor 120 may determine that any irregular events do not occur.

As another example, in a state where a user pattern in which a dog's movement is detected more than a specified number of times in a living room usually between 2:00 pm and 4:00 pm is stored, between 2:00 pm and 2:40 pm, about 40 minutes at home, movement and sound may not occur. For example, the processor 120 may determine that an irregular event has not occurred when the feed amount of a pet feeder decreases by a specified value or more, and may determine that an irregular event has occurred when the feed amount of the pet feeder does not decrease by a specified value or more.

According to various embodiments, the processor 120 may allow a user to set conditions for determining an irregular event through a user interface of an IoT app.

Figure 6:
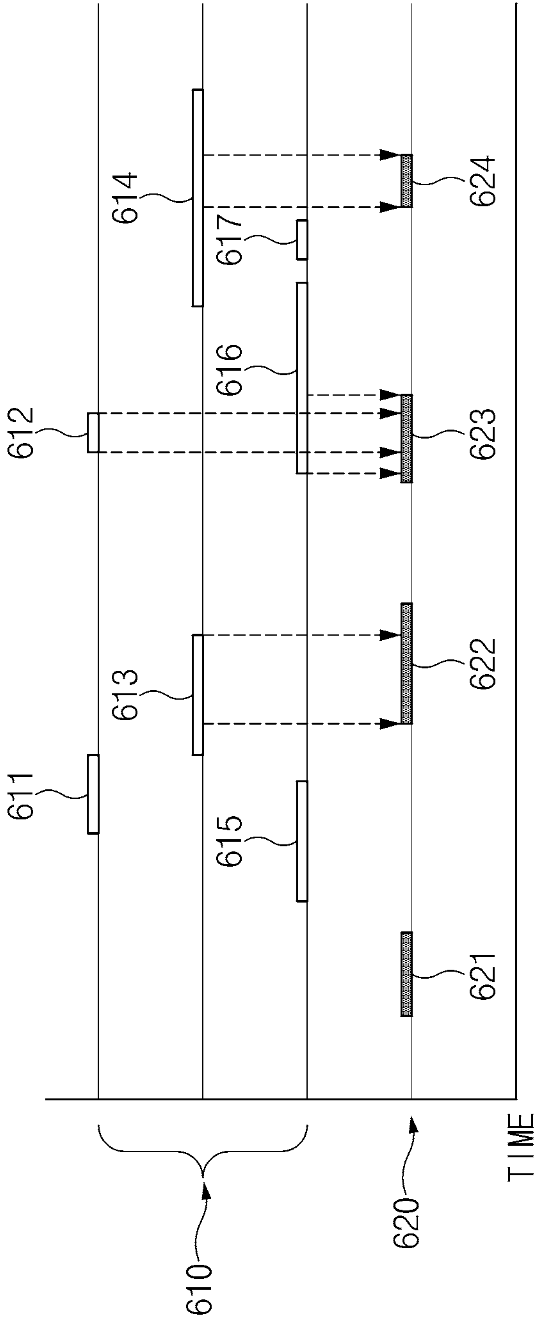
FIG. 6 is a diagram illustrating determining of a matching video clip according to an embodiment of the disclosure.

FIG. 6 is a diagram illustrating determining of a matching video clip according to an embodiment of the disclosure.

Referring to FIG. 6, the processor 120 may determine an irregular event 610 based on second sensing information detected by various IoT devices. The second sensing information may include timestamp information. The processor 120 may extract the occurrence period or occurrence time of the irregular event 610 based on timestamp information.

According to an embodiment, when an IoT app (e.g., SmartThings™ app) is executed in the user terminal 203, the processor 120 may receive image data 620 of a video clip from the server 202. According to an embodiment, the image data of a video clip may include a recording start time of the video clip and length (duration) information of the video clip.

According to various embodiments, the processor 120 may extract a period in which a video clip is stored. When having information about the reason each video clip is generated, the processor 120 may use the reason information as the second sensing information. For example, the reason information may include user setting, automatic setting, IoT device operation, sound generation, motion generation, and/or face recognition.

According to various embodiments, the processor 120 may compare occurrence periods of the irregular event 610 and the plurality of video clips 621 to 624. The processor 120 may compare the time stamp (e.g., start and end points) of the irregular event 610 with the time stamps (e.g., start and end points) of each of the plurality of video clips 621 to 624 to determine a matching video clip.

For example, the processor 120 may compare the sensing information detected by the first IoT device with the user pattern, and determine that a first irregular event 611 and a second irregular event 612 occur in the first IoT device. Among the first to fourth video clips 621 to 624 captured by the camera device 201, the processor 120 may increase the priority of the third video clip 623 whose occurrence time overlaps with that of the second irregular event 612.

As another example, the processor 120 may compare the sensing information detected by the second IoT device with the user pattern, and determine that a third irregular event 613 and a fourth irregular event 614 have occurred in the second IoT device. Among the first to fourth video clips 621 to 624 captured by the camera device 201, the processor 120 may increase the priority of the second video clip 622 whose the occurrence time overlaps with that of the third irregular event 613, and the priority of the fourth video clip 624 whose the occurrence time overlaps with that of the fourth irregular event 614.

As still another example, the processor 120 may compare the sensing information detected by the third IoT device with the user pattern, and determine that a fifth irregular event 615, a sixth irregular event 616 a seventh irregular event 617 have occurred in the third IoT device. Among the first to fourth video clips 621 to 624 captured by the camera device 201, the processor 120 may increase the priority of the third video clip 623 whose occurrence time overlaps with that of the sixth irregular event 616.

Through the above examples, among the first to fourth video clips 621 to 624, the third video clip 623 may have the highest priority, and the first video clip 621 may have the lowest priority.

According to an embodiment, the processor 120 may display the thumbnail image of the third video clip 623 as the largest in the IoT app, and may display the thumbnail image of the first video clip 621 as the smallest or may not display the thumbnail image of the first video clip 621.

Figure 7:
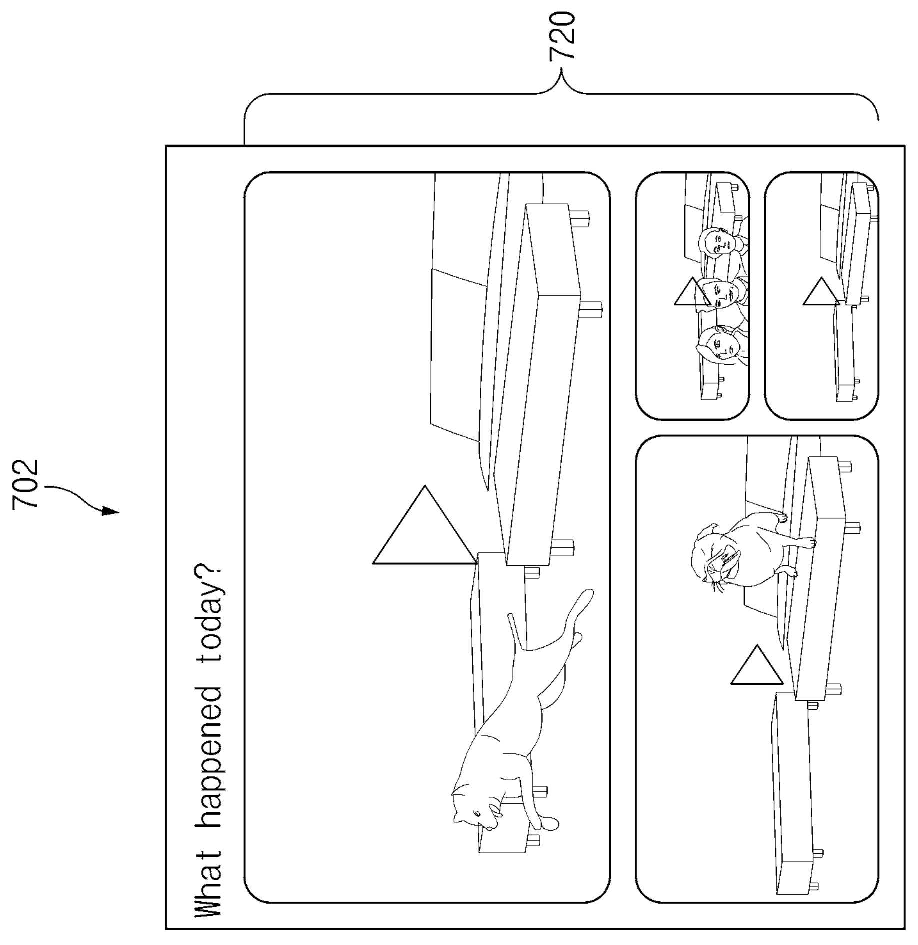
FIG. 7 is a diagram illustrating the display of a list of video clips according to priority according to an embodiment of the disclosure.
Figure 7:
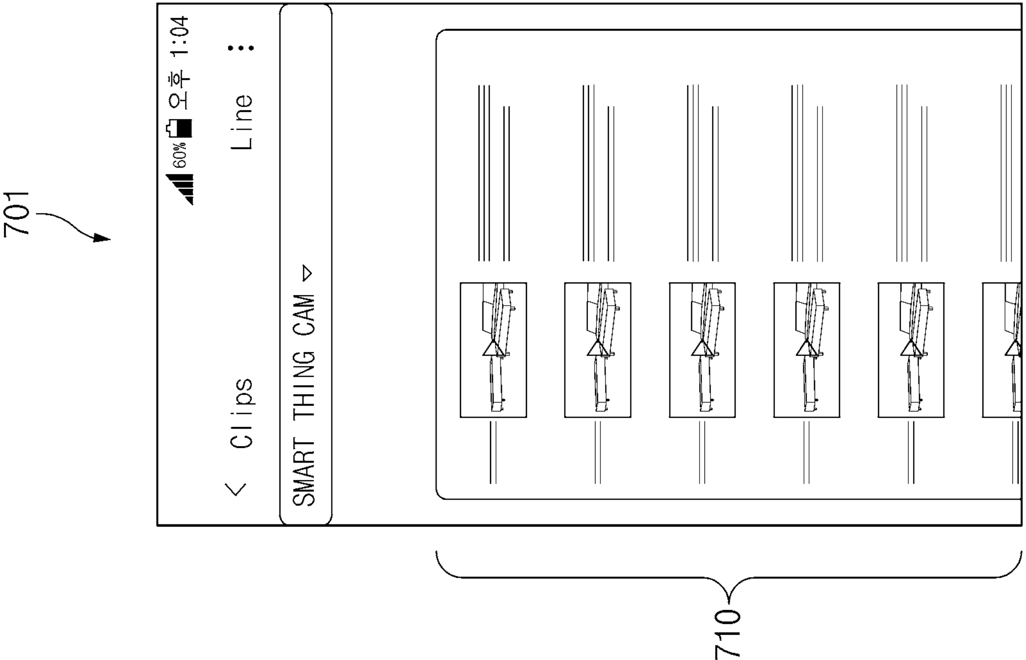

FIG. 7 is a diagram illustrating the display of a list of video clips according to priority according to an embodiment of the disclosure. FIG. 7 is illustrative and the embodiment is not limited thereto.

Referring to FIG. 7, in a first user interface 701 of the IoT app, the processor 120 may display a video clip list 710 to which an irregular event is not reflected. In the video clip list 710, the thumbnails of each video clip may have the same size, and when the installation direction of the camera device 201 is fixed, the thumbnails of the video clips may be displayed as images similar to each other. The user cannot easily recognize the video clip that needs to be checked, and may play all the video clips in sequence or abandon playback.

In a second user interface 702 of the IoT app, the processor 120 may display a video clip list 720 in which an irregular event is reflected. The processor 120 may display thumbnails of each video clip in the form of tiles of different sizes according to priority.

According to various embodiments, the processor 120 may set an image at the time when an irregular event occurs as the thumbnail of each video clip included in the video clip list 720.

According to an embodiment, the processor 120 may automatically reproduce a video clip having the highest priority when the IoT app is executed.

According to an embodiment, the processor 120 may generate and provide type lapse images of video clips having a high priority in advance, repeatedly reproduce a period overlapping with an irregular event, or generate and provide a summary image.

According to various embodiments, the processor 120 may display a thumbnail of a video clip according to a basic setting, and extract and update a thumbnail in which an irregular event is reflected from a background. Alternatively, the processor 120 may provide a type lapse image and/or a summary image in which an irregular event is reflected.

According to various embodiments, the processor 120 may display a thumbnail of a video clip based on a user setting. For example, the processor 120 may display a setting screen for allowing a user to designate a thumbnail. When the user designates a thumbnail related to a specified person and/or animal through the setting screen, the processor 120 may display the thumbnail related to the designated person and/or animal at the top of the second user interface 702 when the IoT app is executed. The processor 120 may determine a video clip related to a designated person (e.g., child) and/or animal (e.g., dog) among irregular events, and display the determined video clip in a specified size or more at the top of the second user interface 702. In addition, the processor 120 may provide a thumbnail of a video clip related to a designated person (e.g., child) and/or animal (e.g., dog) as a type lapse image and/or summary video.

Figure 8:
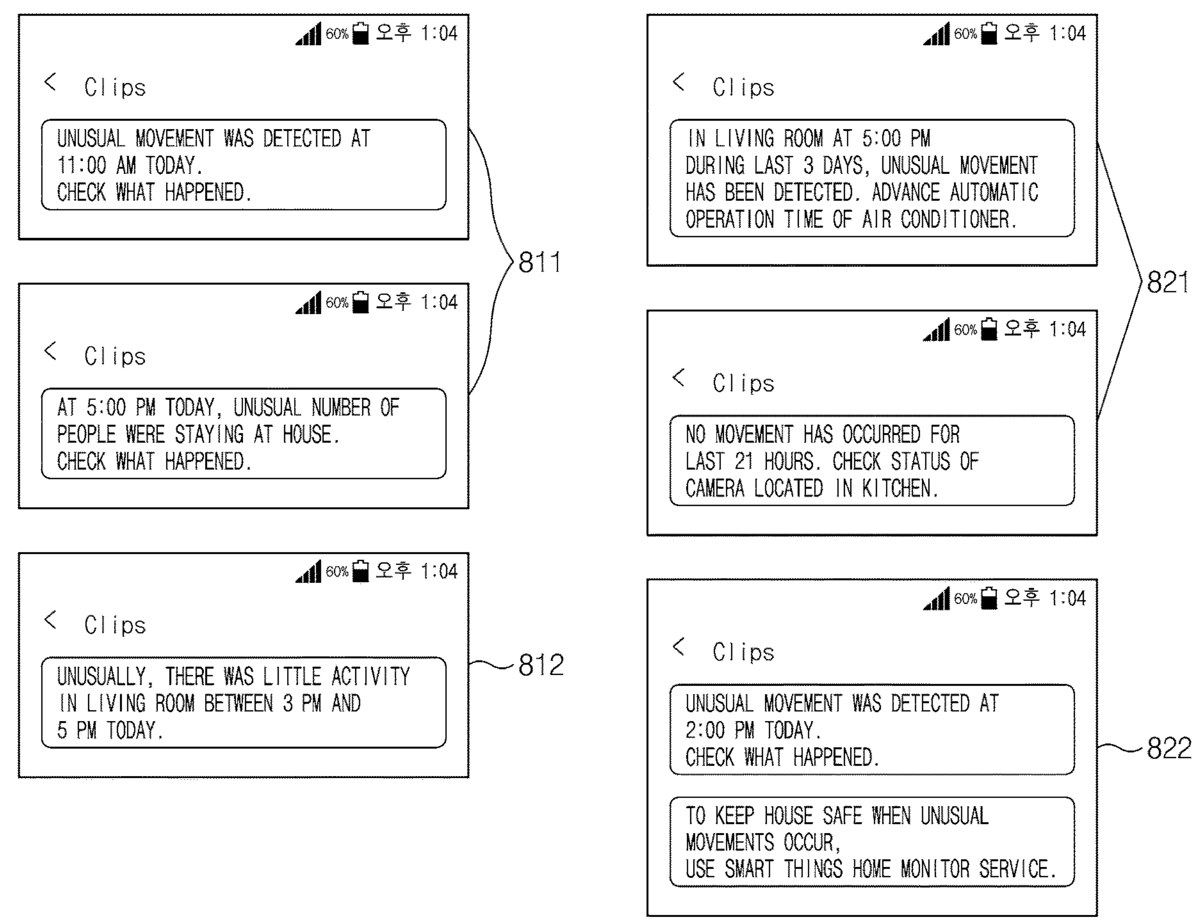
FIG. 8 is a diagram illustrating the displaying of a guide related to an irregular event according to an embodiment of the disclosure.

FIG. 8 is a diagram illustrating the displaying of a guide related to an irregular event according to an embodiment of the disclosure.

Referring to FIG. 8, a message in text form is illustratively illustrated, but the embodiment is not limited thereto.

Referring to FIG. 8, when an irregular event occurs, the processor 120 may display a guide including a notification of the irregular event. For example, the guide may be a pop-up message output from an IoT app.

For example, when an irregular event includes an occurrence period of an activity different from a user pattern, like a first guide 811, the processor 120 may display information (e.g., "Unusual movement was detected at 11:00 am today. Check what happened.", "At 5:00 pm today, an unusual number of people were staying at the house. Check what happened.") on a recognition result (e.g., motion detection or face recognition).

As another example, when the irregular event includes a period in which an activity that repeatedly occurs in a user pattern does not occur, like a second guide 812, the processor 120 may display information (e.g., "Unusually, there was little activity in the living room between 3 pm and 5 pm today.") indicating that no repetitive activity has occurred.

As still another example, the processor 120 may display a third guide 821 (e.g., "In the living room at 5:00 pm during the last 3 days, unusual movement has been detected. Advance the automatic operation time of the air conditioner.", "No movement has occurred for the last 21 hours. Check the status of the camera located in the kitchen.") that indicates a method of changing/adding a separate IoT device related to an irregular event. Alternatively, the processor 120 may display a fourth guide 822 (e.g., "To keep the house safe when unusual movements occur, use the Smart Things Home Monitor service") that indicates a method of using a related service in the IoT app related to an irregular event. Alternatively, the processor 120 may provide information about a change in setting of the IoT App related to an irregular event.

Figure 9:
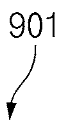
FIG. 9 is a diagram illustrating an example of complexly displaying information or a video clip related to an irregular event according to an embodiment of the disclosure.
Figure 9:
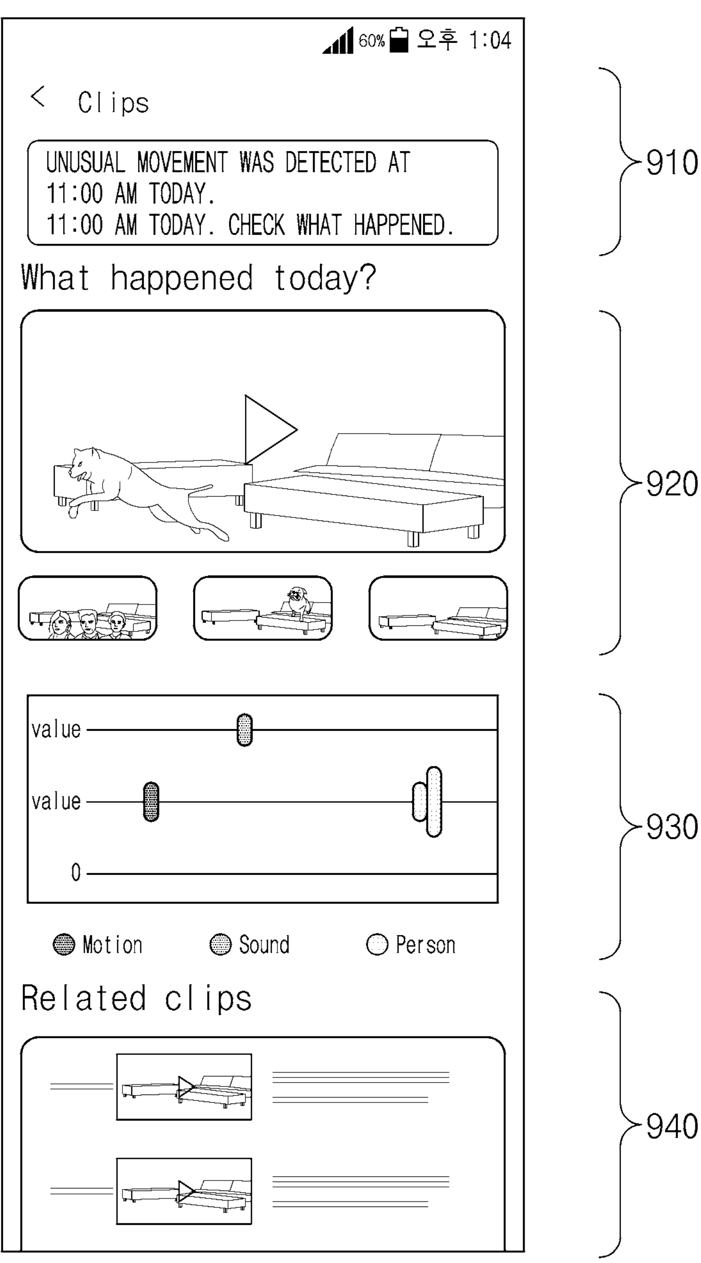

FIG. 9 is a diagram illustrating an example of complexly displaying information or a video clip related to an irregular event according to an embodiment of the disclosure. FIG. 9 is illustrative and the embodiment is not limited thereto.

Referring to FIG. 9, in a first user interface 901 of an IoT app, the processor 120 may display an irregular event guide 910, a first video clip list 920, an irregular event display 930, and a second video clip list 940.

In an embodiment, the irregular event guide 910 may include a user notification related to an irregular event (e.g., "Unusual motion was detected at 11:00 am today. Check out what happened.").

In an embodiment, the first video clip list 920 may display a matching video clip matched with an irregular event as a thumbnail having a different size according to priority.

In an embodiment, the irregular event display 930 may display a reference value and a variation range of an irregular event.

In an embodiment, the second video clip list 940 may display a list of video clips having lower priorities than those of the first video clip list 920. The second video clip list 940 may display a video clip as a thumbnail having the same size.

Figure 10:
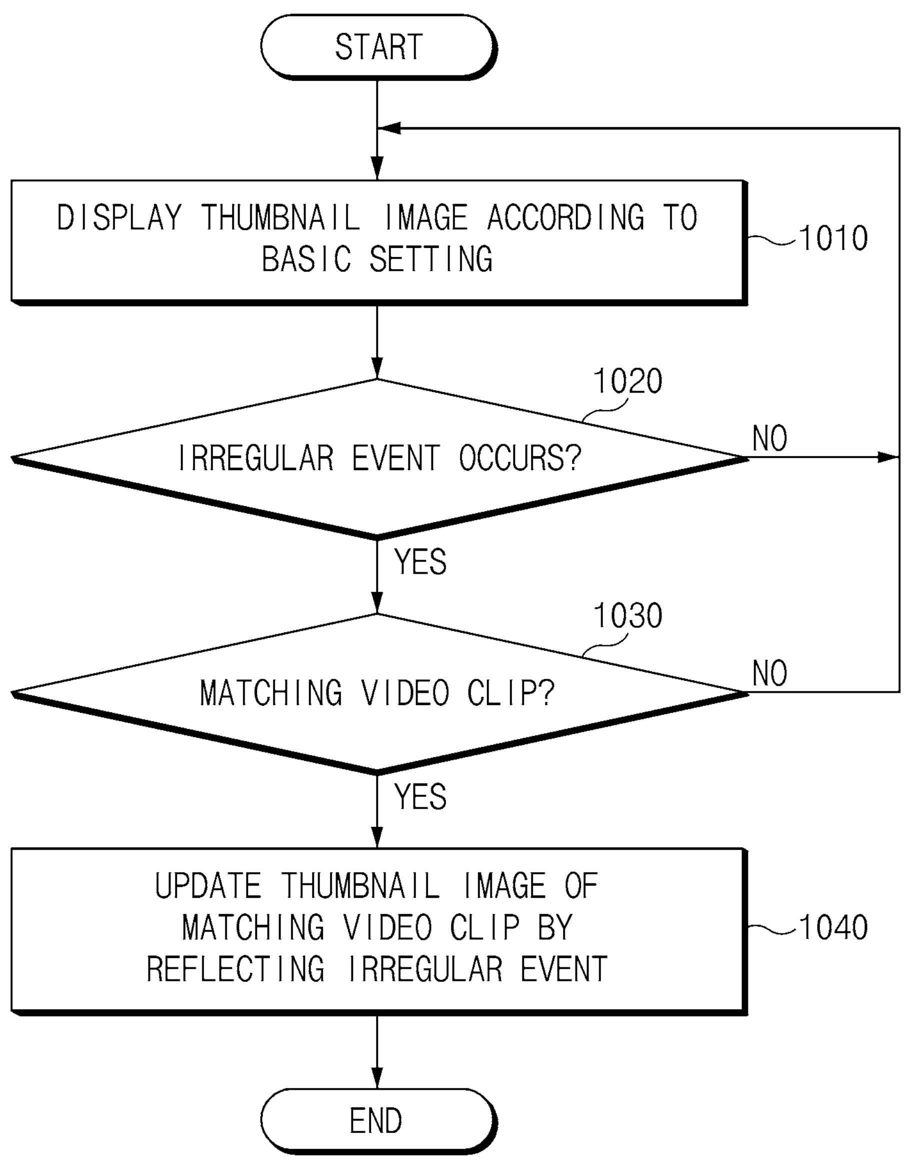
FIG. 10 is a flowchart illustrating an update of a thumbnail image of a video clip according to an embodiment of the disclosure.

FIG. 10 is a flowchart illustrating an update of a thumbnail image of a video clip according to an embodiment of the disclosure.

Referring to FIG. 10, in operation 1010, the processor 120 may display a thumbnail image of a video clip according to a basic setting. The processor 120 may set a thumbnail image as a start image of a video clip in a state prior to recognizing the occurrence of an irregular event.

In operation 1020, the processor 120 may detect the occurrence of an irregular event. The irregular event may be a period in which data different from a stored user pattern is included.

In operation 1020, when the occurrence of an irregular event is detected, the processor 120 may perform operation 1030, and when not detecting the occurrence of an irregular event, the processor 120 may perform operation 1010 again. For example, the thumbnail image displayed in operation 1010 may be maintained. In addition, in displaying a thumbnail image of a video clip by a default setting, when the default setting is changed, the processor 120 may display the thumbnail image of the video clip corresponding to the changed setting. For example, a thumbnail image may be changed from a start image to an end image of a video clip.

In operation 1030, when an irregular event occurs, the processor 120 may determine whether it is a matching video clip. The matching video clip may be a video clip in which the occurrence period of the irregular event and at least a part of the time period overlap.

In operation 1030, the processor 120 may perform operation 1040 in the case of a matching video clip, and perform operation 1010 again in the case of a non-matching video clip. For example, the thumbnail image displayed in operation 1010 may be maintained. In addition, in displaying the thumbnail image of the video clip, the processor 120 may display the thumbnail of the video clip related to the irregular event identified in operation 1020 on an upper end of a second user interface (e.g., the second user interface 702 of FIG. 7) of an IoT app.

In operation 1040, the processor 120 may update the thumbnail image of the matching video clip by reflecting the irregular event. For example, the processor 120 may update the thumbnail image of the matching video clip with an image at the time of occurrence of the irregular event.

According to various embodiments, the processor 120 may first update the thumbnail image of the matching video clip with the image at the time of occurrence of the irregular event. Thereafter, the processor 120 may additionally analyze the pattern of the irregular event, and secondly update the thumbnail image of the matching video clip with an image at the time when the irregular event partially progresses.

Figure 11:
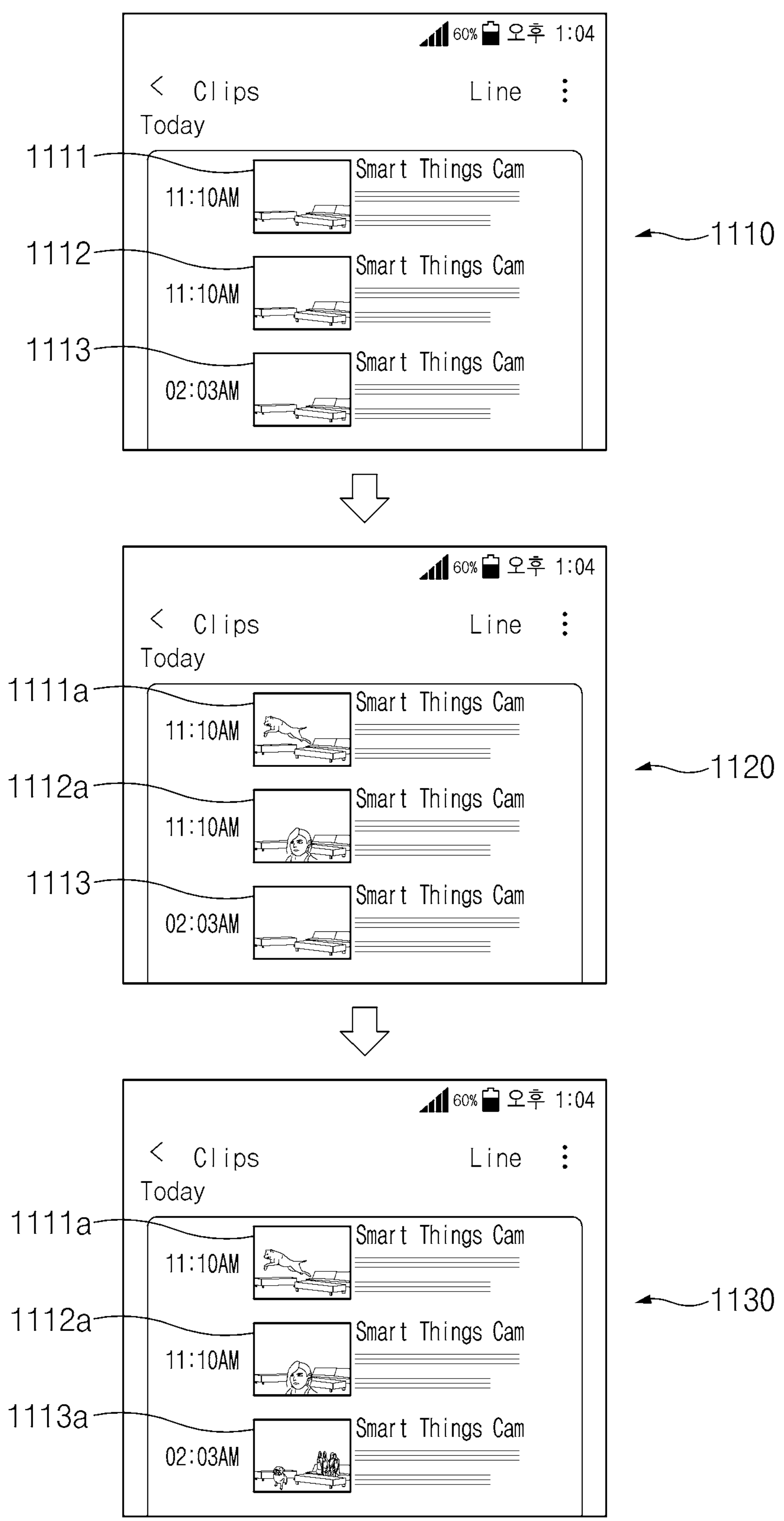
FIG. 11 is a diagram illustrating an example of updating a thumbnail image by reflecting an irregular event according to an embodiment of the disclosure.

FIG. 11 is a diagram illustrating an example of updating a thumbnail image by reflecting an irregular event according to an embodiment of the disclosure. FIG. 11 is illustrative and the embodiment is not limited thereto.

Referring to FIG. 11, in a first user interface 1110 of an IoT app, a list of video clips may be in a state in which an irregular event is not reflected. A basic thumbnail 1111 of the first video clip, a basic thumbnail 1112 of a second video clip, and a basic thumbnail 1113 of a third video clip may be set to images (e.g., the start image of a video clip) similar to each other.

In a second user interface 1120 of the IoT app, the list of video clips may be in a state in which an irregular event is partially reflected. An updated thumbnail 1111*a* of the first video clip and an updated thumbnail 1112*a* of the second video clip may each reflect an irregular event and change to an image during occurrence of the irregular event. In the third video clip, the basic thumbnail 1113 may be maintained as a start image of the video clip.

In the second user interface 1130 of the IoT App, the list of video clips may be in a state in which all irregular events are reflected. The updated thumbnail 1113*a* of the third video clip may additionally reflect an irregular event and be updated with an image during occurrence of the irregular event.

Figure 12:
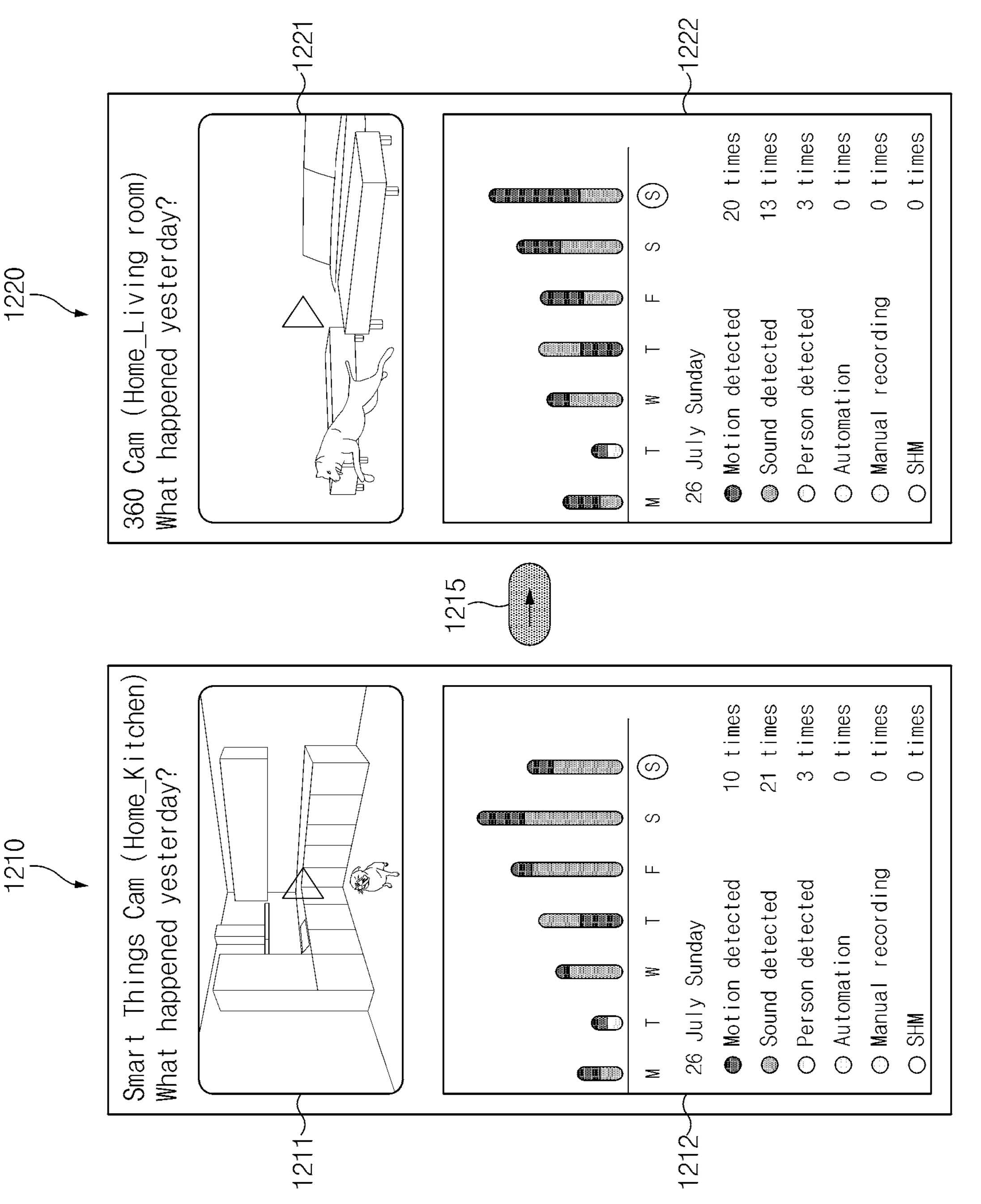
FIG. 12 is a diagram illustrating an example of a screen displaying switching between IoT devices according to an embodiment of the disclosure.

FIG. 12 is a diagram illustrating an example of a screen displaying switching between IoT devices according to an embodiment of the disclosure. FIG. 12 is illustrative and the embodiment is not limited thereto.

Referring to FIG. 12, the processor 120 may classify and display a matching video clip corresponding to an irregular event according to a plurality of IoT devices.

For example, in a first user interface 1210, a thumbnail 1211 of a matching image corresponding to an irregular event generated by a first IoT camera installed in a kitchen and irregular event information 1212 may be displayed. When a user input 1215 (e.g., a swipe input) occurs, the processor 120 may switch to a second user interface 1220 related to a second IoT camera installed in a living room. In the second user interface 1220, a thumbnail 1221 of a matching image corresponding to an irregular event generated by a second IoT camera installed in the living room and irregular event information 1222 may be displayed.

According to various embodiments, the processor 120 may set the priority of matching video clips corresponding to irregular events occurring simultaneously in a plurality of IoT devices to be higher than that of a matching video clip corresponding to an irregular event occurring in one IoT device. Y According to various embodiments, an electronic device (e.g., the electronic device 101 in FIG. 1 or the user terminal 203 in FIG. 2) may include a communication circuit (e.g., the communication module 190 in FIG. 1), a memory (e.g., the memory 130 in FIG. 1), and a processor (e.g., the processor 120 in FIG. 1), wherein the processor may store a user pattern in the memory (e.g., the memory 130 in FIG. 1) based on first sensing information detected during a first time period by at least one of an external camera device (e.g., the camera device 201 in FIG. 2) or an external IoT device, detect occurrence of an irregular event based on second sensing information detected during a second time period by the external camera device (e.g., the camera device 201 in FIG. 2) or the external IoT device and the stored user pattern, match the irregular event that occurs with a plurality of images photographed by the external camera device (e.g., the camera device 201 in FIG. 2), and determine priorities of the plurality of images based on a matching result.

According to various embodiments, the processor (e.g., the processor 120 in FIG. 1) may receive the user pattern from an external server (e.g., the server 108 in FIG. 1 or the server 202 in FIG. 2) through the communication circuit (e.g., the communication module 190 in FIG. 1).

According to various embodiments, the processor (e.g., the processor 120 in FIG. 1) may receive the first sensing information from an external server (e.g., the server 108 in FIG. 1 or the server 202 in FIG. 2) through the communication circuit (e.g., the communication module 190 in FIG. 1), and extract the user pattern based on the received first sensing information.

According to various embodiments, the processor (e.g., the processor 120 in FIG. 1) may compare the user pattern with the second sensing information by dividing the user pattern by a time length equal to the second time period.

According to various embodiments, the processor (e.g., the processor 120 in FIG. 1) may receive the plurality of images photographed during the second time period by the external camera device (e.g., the camera device 201 in FIG. 2).

According to various embodiments, the processor (e.g., the processor 120 in FIG. 1) may increase a priority of an image, among the plurality of images, in which an occurrence period of the irregular event and a photographing period overlap at least partially.

According to various embodiments, the processor (e.g., the processor 120 in FIG. 1) may delete, from among the plurality of images, an image that does not overlap with an occurrence period of the irregular event.

According to various embodiments, the processor (e.g., the processor 120 in FIG. 1) may change sizes of thumbnail images of the plurality of images according to a priority order.

According to various embodiments, the processor (e.g., the processor 120 in FIG. 1) may change thumbnail images of at least some of the plurality of images based on the irregular event.

According to various embodiments, the processor (e.g., the processor 120 in FIG. 1) may change the thumbnail image to an image at a start of the irregular event.

According to various embodiments, the processor (e.g., the processor 120 in FIG. 1) may firstly update thumbnail images of some of the plurality of images based on the irregular event, and secondarily update thumbnail images of other images of the plurality of images based on the irregular event.

According to various embodiments, the first time period may be longer than the second time period.

According to various embodiments, the second sensing information may include a same type of data as the first sensing information.

According to various embodiments, a method of processing an image performed by an electronic device (e.g., the electronic device 101 in FIG. 1 or the user terminal 203 in FIG. 2) may include storing a user pattern in a memory (e.g., the memory 130 in FIG. 1) based on first sensing information detected during a first time period by at least one of an external camera device (e.g., the camera device 201 in FIG. 2) or an IoT device, detecting occurrence of an irregular event based on second sensing information detected during a second time period by the external camera device (e.g., the camera device 201 in FIG. 2) or the external IoT device and the stored user pattern, matching the irregular event that occurs with a plurality of images photographed by the external camera device (e.g., the camera device 201 in FIG. 2), and determining priorities of the plurality of images based on a matching result.

According to various embodiments, the storing of the user pattern may include receiving the user pattern from an external server (e.g., the server 108 in FIG. 1 or the server 202 in FIG. 2) through the communication circuit (e.g., the communication module 190 in FIG. 1) of the electronic device (e.g., the electronic device 101 in FIG. 1 or the user terminal 203 in FIG. 2).

According to various embodiments, the storing of the user pattern may include receiving the first sensing information from an external server (e.g., the server 108 in FIG. 1 or the server 202 in FIG. 2) through the communication circuit (e.g., the communication module 190 in FIG. 1) of the electronic device (e.g., the electronic device 101 in FIG. 1 or the user terminal 203 in FIG. 2), and extracting the user pattern based on the received first sensing information.

According to various embodiments, the matching with the plurality of images may include comparing the user pattern with the second sensing information by dividing the user pattern by a time length equal to the second time period.

According to various embodiments, the matching with the plurality of images may include receiving the plurality of images photographed during the second time period by the camera device (e.g., the camera device 201 in FIG. 2).

According to various embodiments, wherein the determining of the priority may include increasing a priority of an image, among the plurality of images, in which an occurrence period of the irregular event and a photographing period at least partially overlap.

According to various embodiments, the method may further include changing thumbnail images of at least some of the plurality of images based on the irregular event.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a communication circuit configured to transmit and receive data to and from an external device;

a display:

memory storing instructions; and a processor, wherein the instructions, when executed by the processor, cause the electronic device to:

store a user pattern in the memory based on first sensing information detected during a first time period by at least one of an external camera device or an external Internet of things (IoT) device, detect occurrence of an irregular event based on the user pattern and second sensing information detected during a second time period by at least one of the external camera device or the external IoT device, receive a plurality of video clips captured by the external camera device, match the irregular event with a corresponding video clip among the plurality of video clips, determine a priority of the plurality of video clips based on a matching result, and display a plurality of thumbnail images corresponding to respective ones of the plurality of video clips according to the priority on the display, wherein a thumbnail image corresponding to a video clip in which the irregular event occurred is determined based on an image obtained at a start time of the irregular event.

2. The electronic device of claim 1, wherein the instructions, when executed by the processor, further cause the electronic device to:

receive the user pattern from an external server through the communication circuit.

3. The electronic device of claim 1, wherein the instructions, when executed by the processor, further cause the electronic device to:

receive the first sensing information from an external server through the communication circuit; and extract the user pattern based on the received first sensing information.

4. The electronic device of claim 1, wherein the instructions, when executed by the processor, further cause the electronic device to:

compare the second sensing information with the user pattern by dividing the user pattern by a time length equal to the second time period.

5. The electronic device of claim 1, wherein the instructions, when executed by the processor, further cause the electronic device to:

receive the plurality of video clips recoded during the second time period by the external camera device.

6. The electronic device of claim 1, wherein the instructions, when executed by the processor, further cause the electronic device to:

increase a priority of a video clip, among the plurality of video clips, in which an occurrence period of the irregular event and a recording period at least partially overlap.

7. The electronic device of claim 1, wherein the instructions, when executed by the processor, further cause the electronic device to:

delete, from among the plurality of video clips, a video clip that does not overlap with an occurrence period of the irregular event.

8. The electronic device of claim 1, wherein the instructions, when executed by the processor, further cause the electronic device to:

change sizes of thumbnail images of the plurality of video clips according to a priority order.

9. The electronic device of claim 1, wherein the instructions, when executed by the processor, further cause the electronic device to:

firstly update thumbnail images of some video clips of the plurality of video clips based on the irregular event; and secondarily update thumbnail images of other video clips of the plurality of video clips based on the irregular event.

10. The electronic device of claim 1, wherein the first time period is longer than the second time period.

11. The electronic device of claim 1, wherein the second sensing information includes a same type of data as the first sensing information.

12. A method performed by an electronic device, the method comprising:

storing, by the electronic device, a user pattern in a memory of the electronic device based on first sensing information detected during a first time period by at least one of an external camera device or an external Internet of things (IoT) device;

detecting, by the electronic device, an occurrence of an irregular event based on the user pattern and second sensing information detected during a second time period by at least one of the external camera device or the external IoT device;

receiving a plurality of video clips captured by the external camera device;

matching, by the electronic device, the irregular event with a corresponding video clip among the plurality of video clips;

determining, by the electronic device, a priority of the plurality of video clips based on a matching result; and displaying, by the electronic device, a plurality of thumbnail images corresponding to respective ones of the plurality of video clips according to the priority, wherein a thumbnail image corresponding to a video clip in which the irregular event occurred is determined based on an image obtained at a start time of the irregular event.

13. The method of claim 12, wherein the storing of the user pattern comprises:

receiving the first sensing information from an external server through a communication circuit of the electronic device; and extracting the user pattern based on the received first sensing information.

14. The method of claim 12, wherein the storing of the user pattern comprises:

receiving the user pattern from an external server through a communication circuit of the electronic device.

15. The method of claim 12, wherein the matching with the plurality of video clips comprises:

comparing the second sensing information with the user pattern by dividing the user pattern by a time length equal to the second time period.

16. The method of claim 12, wherein the matching with the plurality of video clips comprises:

receiving the plurality of video clips recoded during the second time period by the external camera device.

17. The method of claim 12, wherein the determining the priority of the plurality of video clips comprises:

increasing a priority of a video clip, among the plurality of video clips, in which an occurrence period of the irregular event and a recording period at least partially overlap.

* * * * *